(12) United States Patent
Reszewicz et al.

(10) Patent No.: US 10,539,245 B2
(45) Date of Patent: Jan. 21, 2020

(54) CHECK VALVE

(71) Applicant: Hamilton Sundstrand Corporation, Charlotte, NC (US)

(72) Inventors: Modest Reszewicz, Wroclaw (PL); Pawel Czarnecki, Swidnica (PL)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 78 days.

(21) Appl. No.: 15/653,600

(22) Filed: Jul. 19, 2017

(65) Prior Publication Data

US 2018/0023714 A1 Jan. 25, 2018

(30) Foreign Application Priority Data

Jul. 19, 2016 (EP) ..................................... 16461539

(51) Int. Cl.
*F16K 15/03* (2006.01)
(52) U.S. Cl.
CPC .......... *F16K 15/038* (2013.01); *F16K 15/033* (2013.01)
(58) Field of Classification Search
CPC ......... Y10T 137/7837; Y10T 137/7898; F16K 1/523; F16K 15/038; F16K 15/033
See application file for complete search history.

(56) References Cited

U.S. PATENT DOCUMENTS

| 3,384,112 A | 5/1968 | Smith | |
|---|---|---|---|
| 4,867,199 A * | 9/1989 | Marx | F16K 15/038 |
| | | | 137/512.1 |
| 5,392,810 A * | 2/1995 | Cooper | F16K 15/038 |
| | | | 137/512.1 |
| 7,568,498 B2 * | 8/2009 | Denike | F16K 15/038 |
| | | | 137/512.1 |
| 8,726,930 B2 | 5/2014 | Barone | |
| 2009/0032119 A1 * | 2/2009 | Dulay | F16K 15/038 |
| | | | 137/527 |

(Continued)

FOREIGN PATENT DOCUMENTS

| EP | 2249068 A2 | 11/2010 |
|---|---|---|
| EP | 2980461 A1 | 2/2016 |

OTHER PUBLICATIONS

Definition of "Serpentine" by Merriam Webster. Printed Dec. 2018 (Year: 2018).*

(Continued)

*Primary Examiner* — Jessica Cahill
*Assistant Examiner* — Patrick C Williams
(74) *Attorney, Agent, or Firm* — Cantor Colburn LLP

(57) ABSTRACT

According to the present disclosure, there is provided a check valve comprising a valve housing defining a pair of valve openings. A pair of flapper elements are pivotably mounted to at least one hinge pin for rotation relative to the housing between an open position in which they permit fluid flow through the respective valve openings and a closed position in which they prevent fluid flow through the valve openings. The check valve also includes at least one hinge pin receiving post that extends upwardly from the valve housing, wherein the at least one hinge pin receiving post comprises a first, lower end portion having an opening for receiving said at least one hinge pin, a second, upper end portion and a flexible, serpentine portion intermediate said end portions.

5 Claims, 7 Drawing Sheets

(56) References Cited

U.S. PATENT DOCUMENTS

2013/0019966 A1     1/2013   Hawa
2016/0146361 A1*    5/2016   Solarz ................... F16K 15/038
                                                          137/527
2016/0146362 A1*    5/2016   Solarz ................... F16K 15/038
                                                          137/527
2017/0292621 A1*   10/2017   Olszowy ................ F16K 15/03

OTHER PUBLICATIONS

Definition of "Snake" by Merriam Webster. Printed Dec. 2018 (Year: 2018).*
European Search Report for Application No. 16461539.5-1754 dated Jan. 20, 2017, 6 pages.

* cited by examiner

CHECK VALVE

FOREIGN PRIORITY

This application claims priority to European Patent Application No. 16461539.5 filed Jul. 19, 2016, the entire contents of which is incorporated herein by reference.

TECHNICAL FIELD

The present disclosure relates to check valves.

BACKGROUND

It is known to use check valves to allow fluid flow in one direction, and to prevent flow in the opposite direction. Check valves are used in a wide variety of applications, for example in air conditioning systems, for example in aircraft air conditioning systems.

Check valves commonly include a pair of valve elements or flappers located at an opening in a valve housing. The flappers are hingedly supported on a hinge pin mounted to the valve housing for rotation between a closed position in which they lie across and close the opening, preventing fluid flow through the opening in one direction and an open position in which, under the pressure of a fluid (gas or liquid) on one side of the check valve, the flappers rotate from their closed positions so as to allow the fluid to flow through the valve in the opposite direction.

In known check valve arrangements, a stop is provided to limit the rotational movement of the flapper elements as they open. In some arrangements, the stop comprises a stop pin which is mounted to mounting posts arranged on opposed sides of the valve housing opening. The stop pin is spaced from the opening such that when the flappers open, they engage the stop pin.

The flapper elements of such prior art flapper valves typically do not reach the fully open position simultaneously, and there is a slight delay between impacts. As the flapper elements typically open at high velocities and may impact the stop pin with considerable force, the stop pin and receiving posts themselves must be sufficiently robust to withstand the impact force of the flapper elements and to avoid the costly and time consuming process of replacing damaged parts. This may mean that the stop pin, hinge pin receiving posts and the flapper elements may have to be relatively heavy, which may have implications for example in aircraft applications.

The present disclosure relates to a check valve which includes a modified hinge pin and stop pin receiving post arrangement.

SUMMARY

According to the present disclosure, there is provided a check valve comprising a valve housing defining a pair of valve openings. A pair of flapper elements are pivotably mounted to at least one hinge pin for rotation relative to the housing between an open position in which they permit fluid flow through the respective valve openings and a closed position in which they prevent fluid flow through the valve openings. At least one hinge pin receiving post extends upwardly from the valve housing. The at least one hinge pin receiving post comprises a first, lower end portion having an opening for receiving the at least one hinge pin, a second, upper end portion and a flexible, serpentine portion intermediate the end portions.

In certain embodiments, the check valve may comprise a pair of hinge pin receiving posts arranged on opposed sides of the valve openings.

In certain embodiments, the upper end portion of each hinge pin receiving post may comprise an opening, and the check valve may further comprise a stop pin received in the openings and extending between the receiving posts and arranged such that the flapper elements will contact the stop pin when in their fully open positions.

In other embodiments, the upper end portion of the hinge pin receiving post may comprise opposed stop surfaces, arranged such that the flapper elements will contact the stop surfaces when in their fully open positions.

In certain embodiments, the upper end portion may project inwardly towards said valve openings.

In other embodiments, the check valve may comprise a hinge pin receiving post arranged intermediate opposed sides of the valve openings, and the upper end portion of the intermediate hinge pin receiving post may comprise opposed stop surfaces arranged such that the flapper elements will contact the stop surfaces when in their fully open positions.

In certain embodiments, the at least one hinge pin receiving post may be formed integrally with the valve housing.

In other embodiments, the at least one hinge pin receiving post may be formed separately from the valve housing and secured thereto by one or more fasteners.

According to a second aspect of the present disclosure, there is provided a hinge pin receiving post for use in any of the foregoing check valves, wherein the hinge pin receiving post comprises a first, lower end portion having an opening for receiving said at least one hinge pin and for mounting to the valve housing, a second, upper end portion and a flexible, serpentine portion intermediate the end portions.

In certain embodiments of the above hinge pin receiving post, the upper end portion of the hinge pin receiving post may an opening for receiving a stop pin.

In other embodiments of the hinge pin receiving post, the upper end portion of the hinge pin mounting post may comprise opposed stop surfaces.

In certain embodiments of any of the foregoing check valve or hinge pin receiving posts, the serpentine intermediate portion may comprise a series of slots extending into opposed sides of the hinge pin receiving post in an alternating manner.

In certain embodiments of the foregoing check valve or hinge pin receiving post, the inner end of each slot may be enlarged relative to a medial portion of the slot.

In certain embodiments of the foregoing check valve or hinge pin receiving post, the slots may be machined, for example electrodischarged machined, into the hinge pin receiving post or may be moulded into the hinge pin receiving post In certain embodiments of any of the foregoing check valve or hinge pin receiving posts, the hinge pin receiving posts may be formed of metal, for example steel, an aluminum alloy or a titanium alloy or may be formed of a non-metallic material, for example of a fiber reinforced polymer or plastic material.

BRIEF DESCRIPTION OF DRAWINGS

Some exemplary embodiments and features of the present disclosure will now be described by way of example only, and with reference to the following drawings in which.

DETAILED DESCRIPTION

Figure 1:
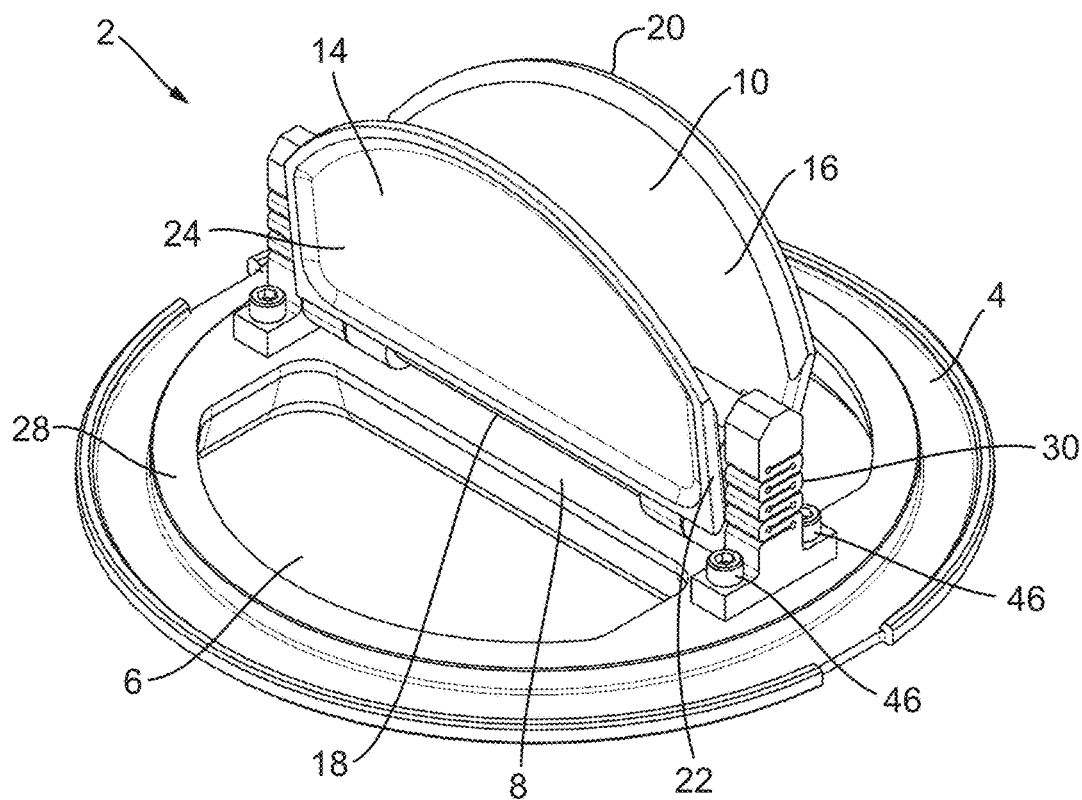
FIG. 1 shows a perspective view of a first embodiment of check valve in accordance with this disclosure, in an open position.
Figure 2:
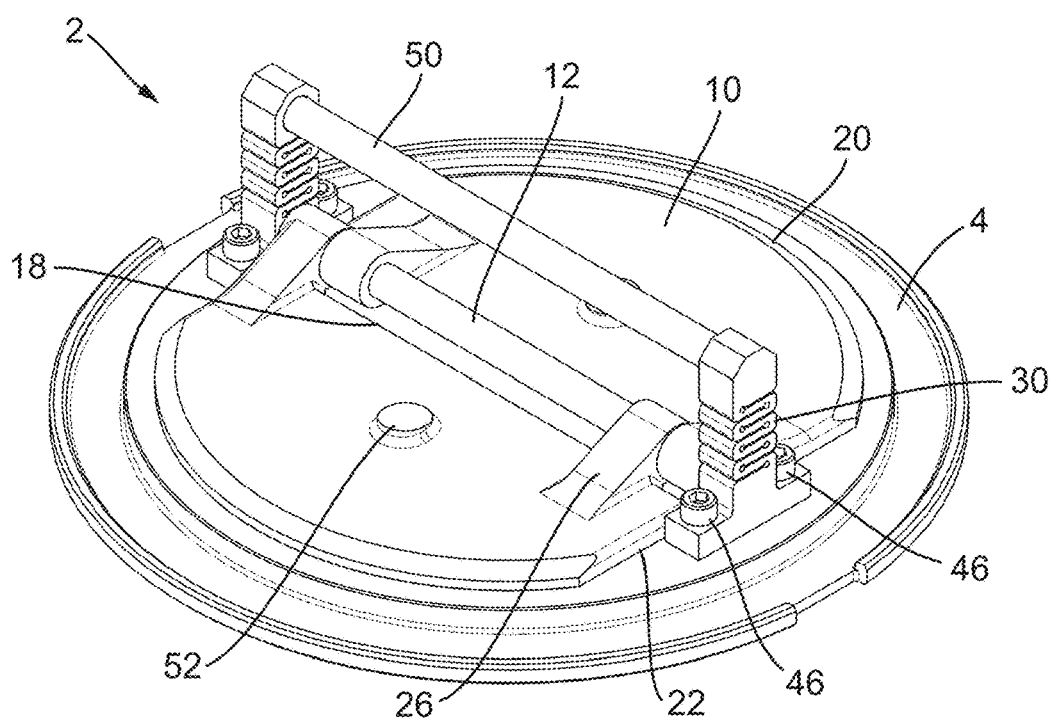
FIG. 2 shows a perspective view of the check valve of FIG. 1 in a closed position.
Figure 3:
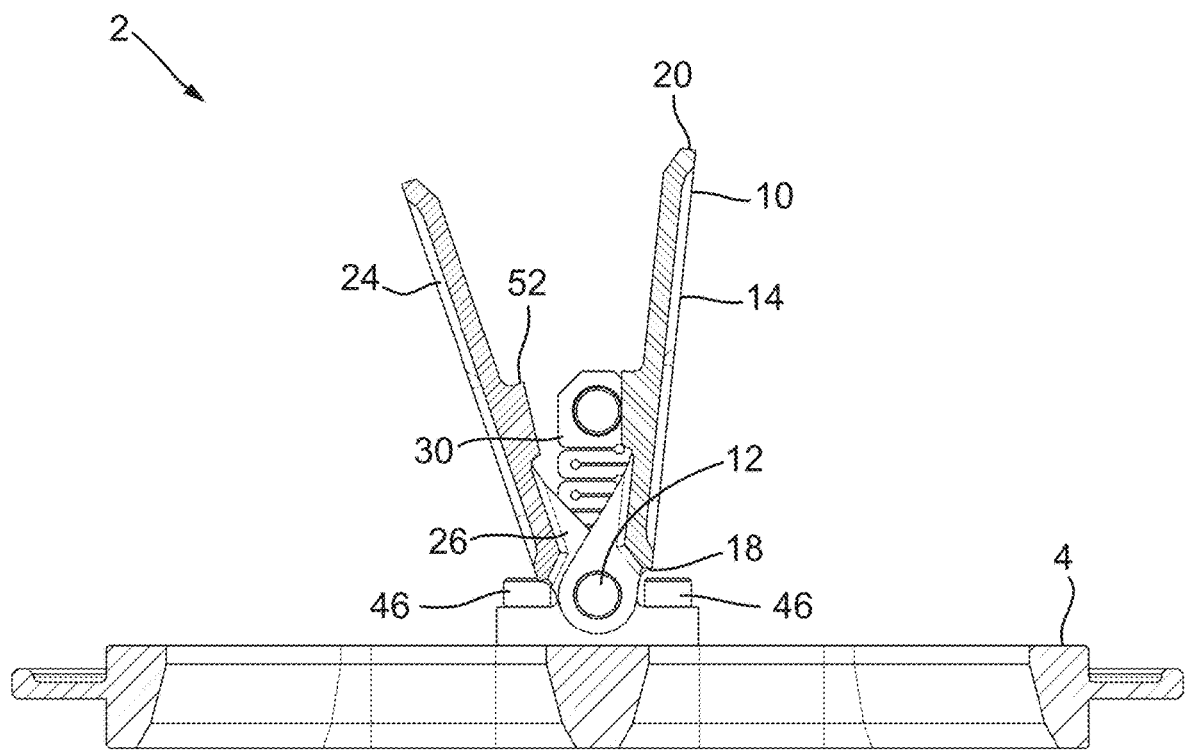
FIG. 3 shows a section view of the check valve of FIGS. 1 and 2, in an open position.
Figure 4:
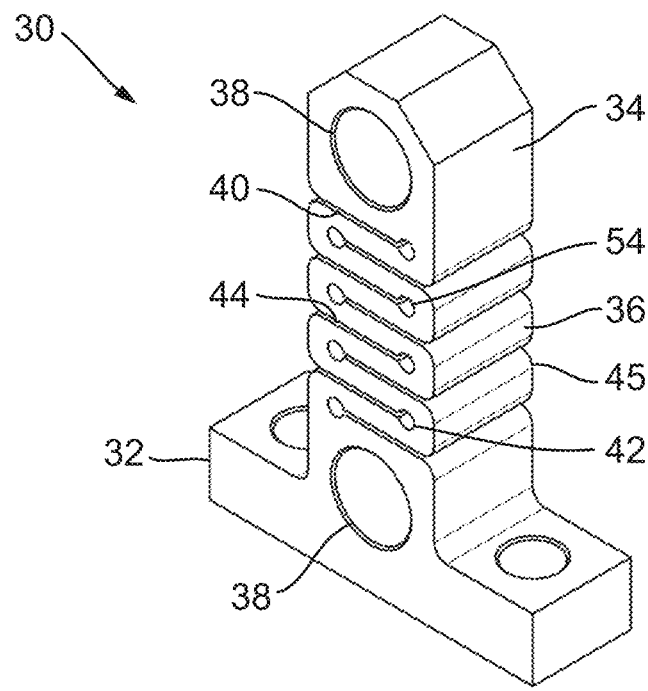
FIG. 4 shows a perspective view of a first embodiment of hinge pin receiving post in accordance with this disclosure.
Figure 5:
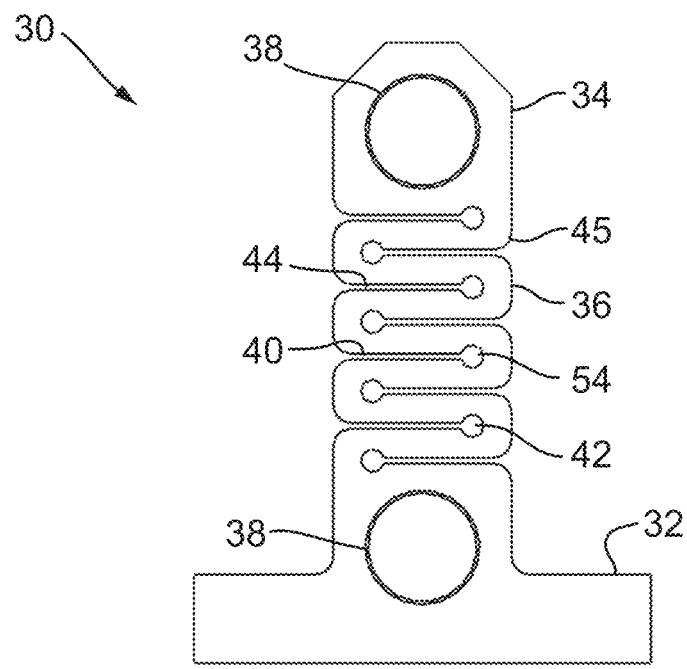
FIG. 5 shows a front view of the hinge pin receiving post of FIG. 7.

A first embodiment of check valve in accordance with the present disclosure is illustrated in FIGS. 1 to 3.

The check valve 2 comprises a valve housing 4. The valve housing 4 is a generally planar annular element which in use may be mounted in a pipe, duct or the like in order to prevent reverse flow of a fluid therethrough. The valve housing 4 comprises a pair of generally D-shaped valve openings 6 which are separated by a central web 8 of the valve housing 4. It will be appreciated that the disclosure is not limited to such a shape of valve openings 6 and other shapes may fall within the scope of this disclosure.

The valve openings 6 are closed by a pair of generally D-shaped flapper elements 10 which are pivotally mounted to at least one hinge pin 12. It will be appreciated that the disclosure is not limited to such a shape of flapper elements 10 and other shapes may fall within the scope of this disclosure, depending on the shape of the valve openings 6. The hinge pin 12 may be a unitary structure (as illustrated), or be constituted from two or more sections, depending upon the check valve construction, for example.

Figure 6:
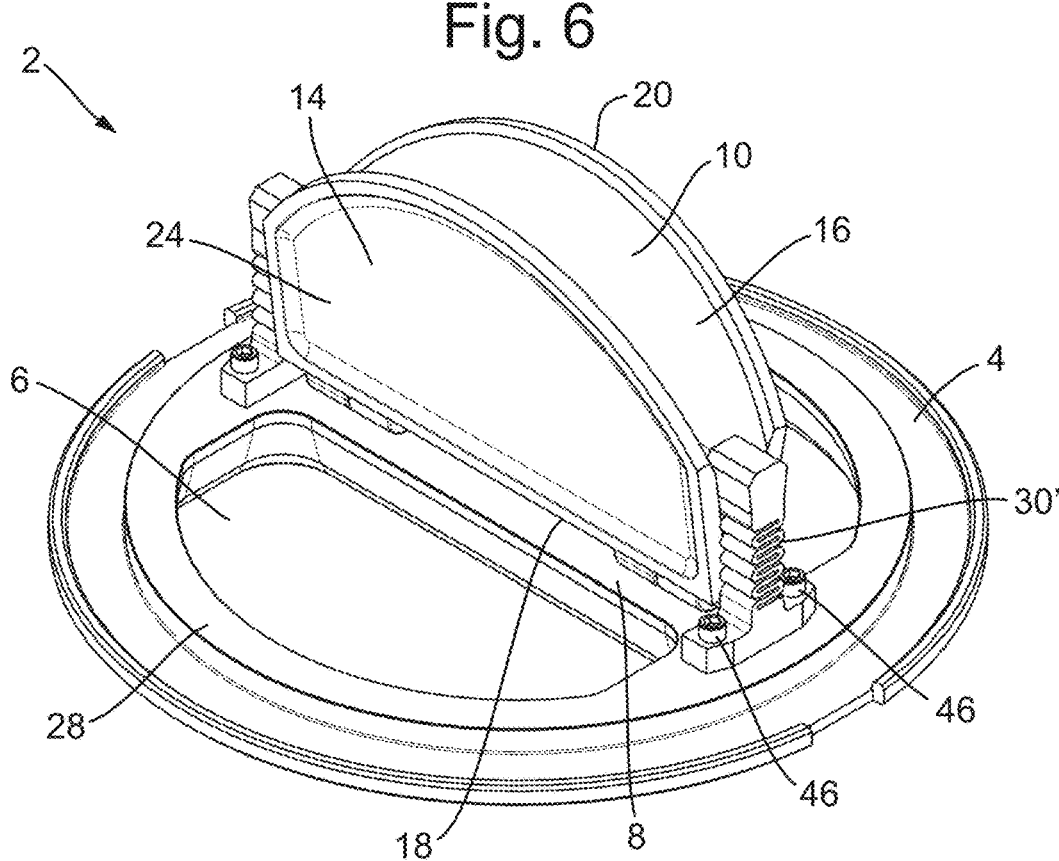
FIG. 6 shows a perspective view of a second embodiment of check valve in accordance with this disclosure, in an open position.
Figure 7:
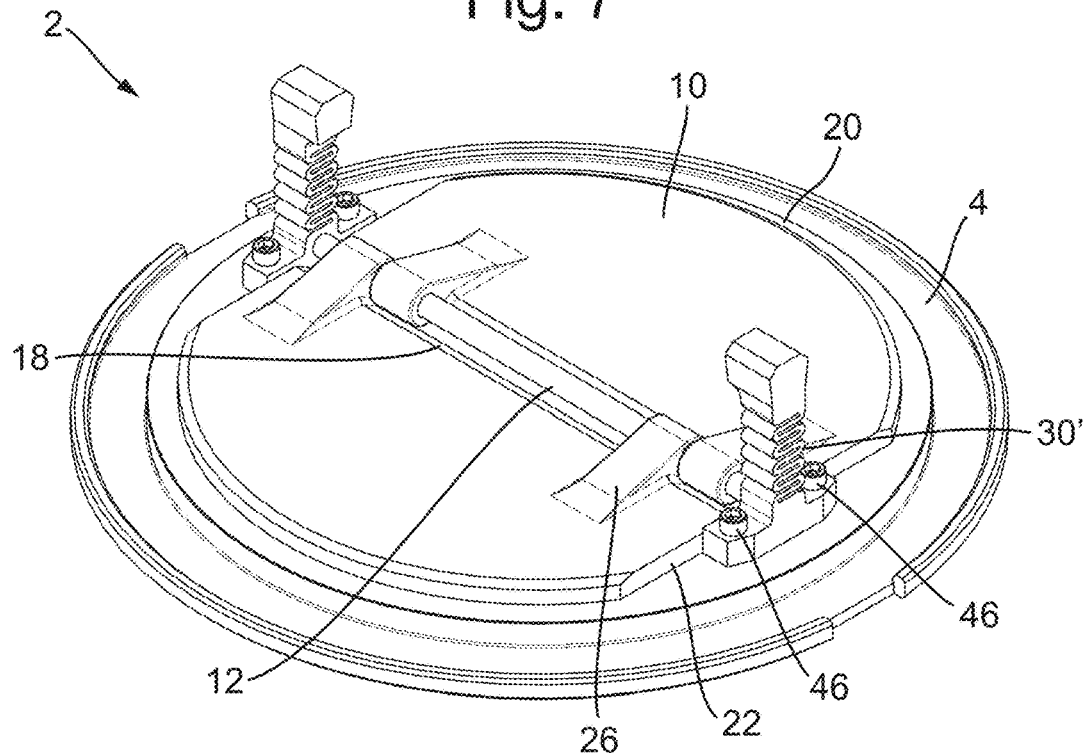
FIG. 7 shows a perspective view of a the check valve of FIG. 6, in a closed position.
Figure 8:
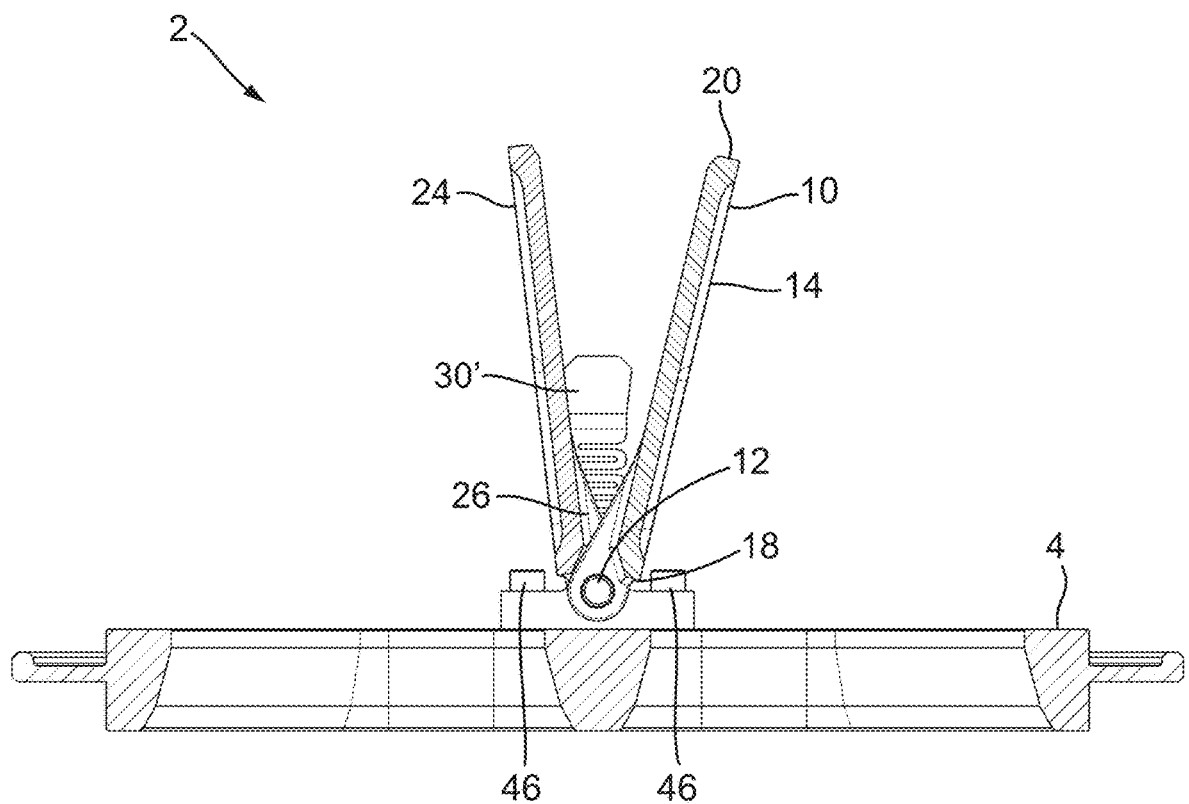
FIG. 8 shows a section view of the check valve of FIGS. 6 and 7, in an open position.
Figure 9:
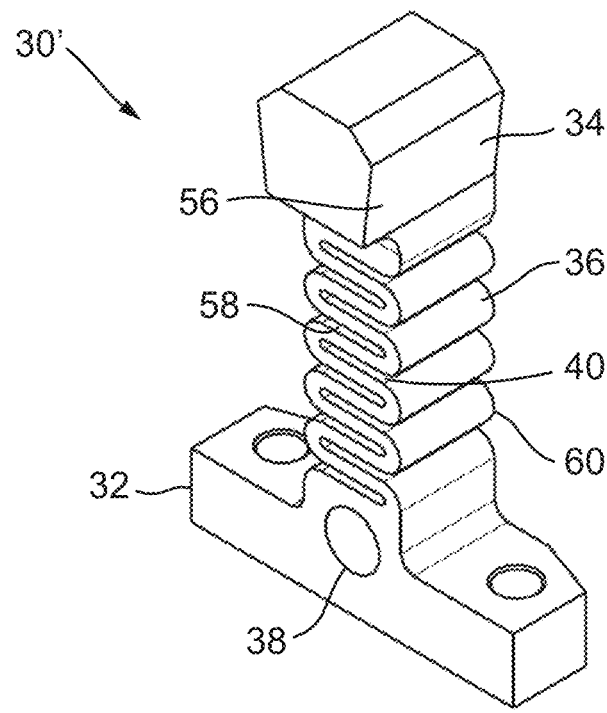
FIG. 9 shows a perspective view of a second embodiment of hinge pin receiving post in accordance with this disclosure.
Figure 10:
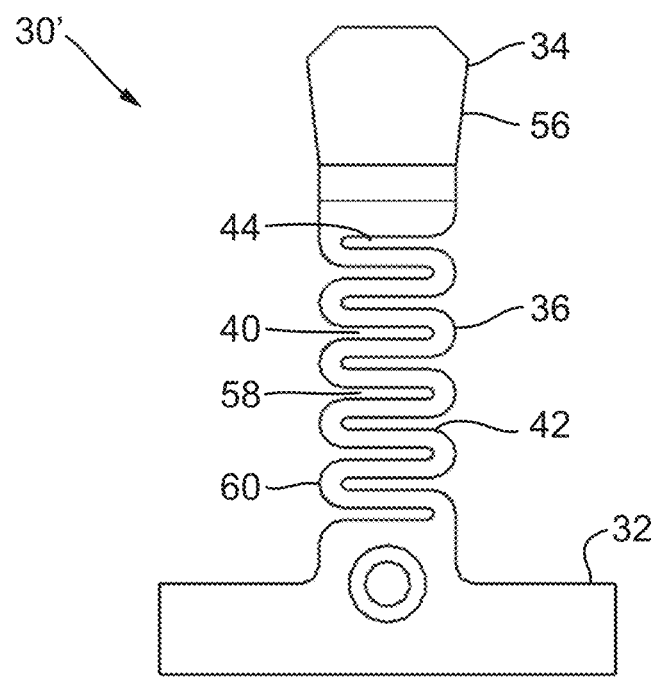
FIG. 10 shows a front view of the hinge pin receiving post of FIG. 9.

In operation, each of the adjacent flapper elements 10 is configured to move pivotally about the hinge pin 12 between a closed position as shown in FIGS. 2 and 7, and a fully open position as shown in FIGS. 1, 3, 6 and 8 (and vice versa).

The flapper elements 10 are generally planar and include a lower surface 14, an upper surface 16 opposite the lower surface 14 a proximal end 18, a distal end 20 and side ends 22. The lower surfaces 14 of the flapper elements 10 are provided with a plurality of recesses 24, for weight saving purposes, although this is not essential.

In certain arrangements (not shown), the check valve 2 may include one or more biasing elements, for example one or more springs provided to bias the flapper elements 10 towards their closed position. In one arrangement, the biasing element may comprise a torsion spring mounted around the hinge pin 12. It will be appreciated that other suitable biasing members may fall within the scope of the present disclosure.

Each of the flapper elements 14 also includes one or more mounting lugs 26, in this embodiment, although not limited to, two mounting lugs 26, positioned at opposite sides of its proximal end 18. The mounting lugs 26 have respective bores through which the hinge pin 12 extends.

The peripheral region of the lower surface 14 of each flapper element 10 engages a flange 28 surrounding the respective valve openings 6 when the valve 2 is in the closed position, forming a seal therebetween.

At least one hinge pin receiving post 30 extends upwardly from the valve housing 4, embodiments of which will be described in detail below. In any case, the at least one hinge pin receiving post 30 comprises a first, lower end portion 32, a second, upper end portion 34 and a flexible, serpentine portion 36 positioned intermediate the first and second end portions 32, 34.

The lower end portion 32 of the hinge pin receiving post 30 includes an opening 38 for receiving the at least one hinge pin 12. The opening 38 can be open at both ends, or just at one end as illustrated.

The intermediate serpentine portion 36 includes a plurality of slots 40 that extend into opposed sides of the hinge pin receiving post 30 in an alternating manner. Each of the slots 40 includes an inner end 42 and a medial portion 44. The slots extend parallel to one another and to the valve housing 4. It will be appreciated, however, that slots 40 that extend at angles to one another or at angles to the valve housing may fall within the scope of this disclosure.

In certain embodiments, the check valve 2 includes a pair of hinge pin receiving posts 30 arranged on opposite sides of the valve housing 4, the posts 30 acting to mount the hinge pin 12 to the check valve 2. It will be appreciated, as will be described below, that other hinge pin receiving post 30 arrangements, such as a single hinge pin receiving post 30 positioned intermediate the opposed sides of the valve housing 4, for example, fall within the scope of the present disclosure.

In this embodiment, the hinge pin receiving posts 30 are separately formed from the valve housing 4 and mounted thereto by fastening means 46 (as illustrated in FIGS. 1 to 10), for example by bolts, welding, brazing, or by any other suitable fastening means. However, it will be appreciated that the hinge pin receiving posts 30 may be integrally formed, for example cast, with the valve housing 4.

A first embodiment of the hinge pin receiving post 30 and check valve 2 of the present disclosure for use in the aforementioned check valve 2 is illustrated in FIGS. 1 to 5.

As shown, the second, upper end portion 34 includes an opening 48 for receiving a stop pin 50. As illustrated in FIGS. 1 and 2, the stop pin 50 extends between the hinge pin receiving posts 30 above the hinge pin 12. The term pin as used herein does not imply any particular shape or dimension. For example, while the stop pin 50 is shown as circular in cross section, it could have other cross sectional shapes. It also encompasses multi-part constructions as well as unitary constructions.

In this embodiment, the upper surface 16 of each of the flapper elements 10 includes at least one bumper element 52. The bumper elements 52 may be formed integrally, for example cast, with the flapper elements 10 as illustrated in FIG. 2. Alternatively, the bumper elements 52 may be separately formed from the valve housing 4 and mounted thereto by suitable means. When the flapper elements 10 move into the fully open position, the bumper elements 52 on the upper surfaces 16 of the flapper elements 10 engage with the stop pin 50, preventing pivotal movement of each of the flapper elements 10 beyond this angle. Thus, during impacts between the flapper elements 10 and stop pin 50, energy is transferred from the flapper element 10 to the stop pin 50 and into the hinge pin receiving posts 30.

In this embodiment, the inner ends 42 of each of the slots 40 of the intermediate serpentine portion 36 are enlarged compared with the medial portions 44 thereof, such that a relief hole 54 is formed at the inner end 42 of each slot 40. The enlargement of the slot inner ends 42 reduces the stresses at the inner ends 42. It will be appreciated that the diameter of the relief holes 54 may be any suitable size, and any number of the slots 40 may or may not include such a relief hole 54 (see FIGS. 9 and 10, for example), depending on stress distribution or weight saving requirements of the check valve 2, for example.

The outer ends 45 of the slots 40 are also chamfered or rounded to reduce stresses.

A second, alternative embodiment of hinge pin receiving post 30' of the present disclosure for use in the aforementioned check valve 2 is illustrated in FIGS. 6 to 10.

As shown, in this embodiment, the second, upper end portion 34 of the hinge pin receiving posts 30' include opposed stop surfaces 56. As illustrated in FIGS. 6 and 7, the stop surfaces 56 are arranged such that, in operation, when the flapper elements 10 move into the fully open position, edge portions of the upper surfaces 16 of the flapper elements engage with the stop surfaces 56 of the hinge pin receiving posts 30', preventing pivotal movement of each of the flapper elements 10 beyond this angle. Thus, during impacts between the flapper elements 10 and stop surfaces 56, energy is transferred directly into the hinge pin receiving posts 30'.

In this embodiment also, the serpentine portion 40 is formed as a continuous wave-like portion, with parallel sections 58 joined by rounded outer sections 60, the gaps between the parallel sections forming slots 40.

Figure 11:
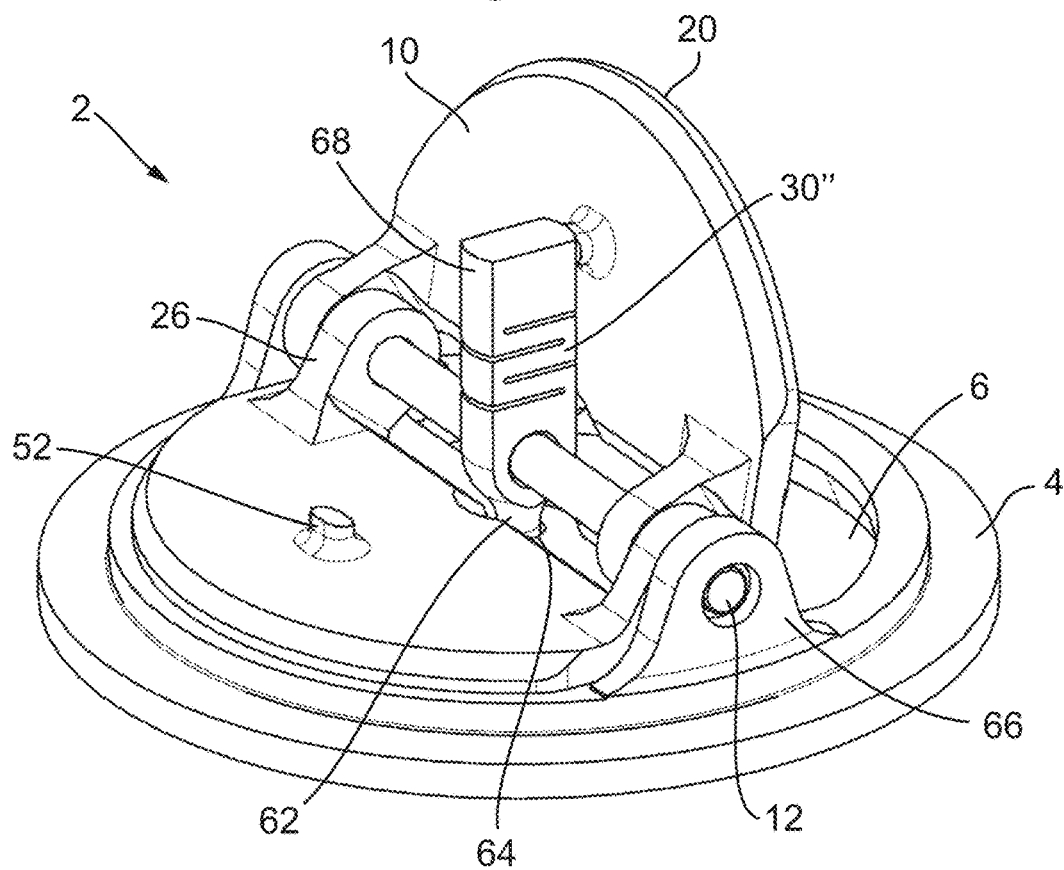
FIG. 11 shows a perspective view of a third embodiment of check valve in accordance with this disclosure, with one flapper element in an open position.
Figure 12:
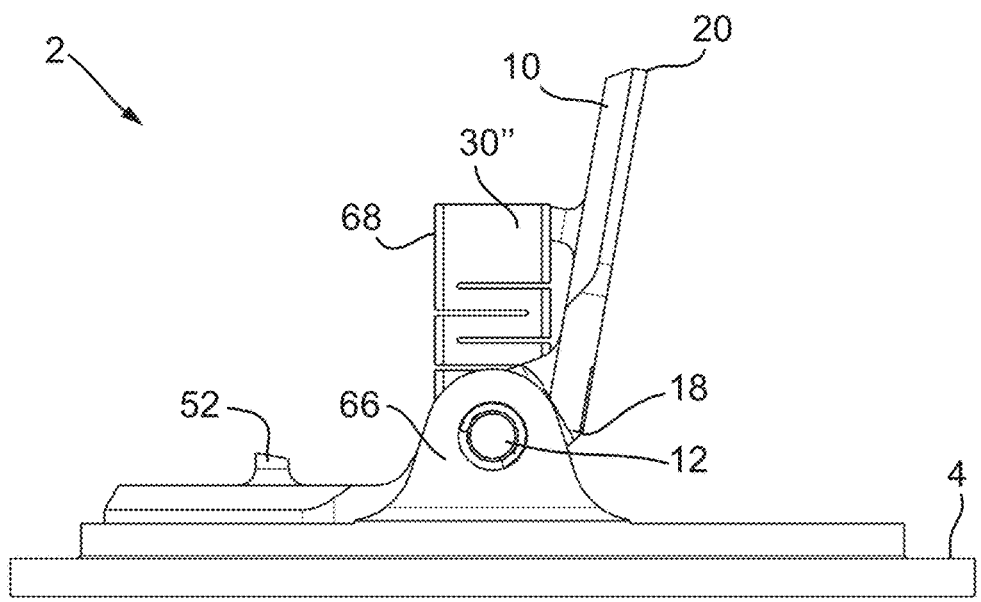
FIG. 12 shows a side view of the check valve of FIG. 11.

A third embodiment of the hinge pin receiving post 30" and check valve 2 of the present disclosure for use in the aforementioned check valve 2 is illustrated in FIGS. 11 and 12.

As shown, in this embodiment, the check valve 2 includes a single hinge pin receiving post 30" arranged intermediate opposed sides of the valve openings 6. Although illustrated as being positioned centrally, it will be appreciated that the hinge pin receiving post 30" may be arranged at any suitable position between the valve openings 6, depending on stress distribution requirements, for example. It will also be appreciated, although not illustrated, that multiple intermediate hinge pin receiving posts may be arranged between the valve openings.

In this embodiment, the lower portion 32 of the hinge pin receiving post 30" includes a mounting portion 62. In this embodiment, the mounting portion 62 is cylindrical, but other shapes are possible. The central web 8 of the valve housing 4 includes an opening 64 for receiving the mounting portion 62 so as to locate the hinge pin receiving post 30" in position. In this embodiment, the mounting portion 62 is sized such that it can be simply slotted into the opening 64 such that it is removably mounted to the central web 8 of the valve housing 4. Alternatively, it will be appreciated that the mounting portion 62 may be secured into the opening 64 by any suitable means. Further alternatively, the hinge pin receiving post 30" may be formed integrally with the valve housing 4, for example cast therewith.

In this embodiment, check valve 2 includes a pair of hinge pin mounting posts 66 arranged on opposed sides of the valve openings 6 that are configured to mount the hinge pin 12 in position. Hence, in this embodiment, the hinge pin receiving post 30" acts only as a stop element, and does not act also to mount the hinge pin 12 in position as with the aforementioned embodiments.

The lower portion 32 of the hinge pin receiving post 30" includes an opening 38 through which the hinge pin 12 will extend. The hinge pin 12, in this embodiment, will retain the hinge pin receiving post 30" in position on the valve housing 4 and prevent any significant angular movement thereof.

As illustrated, in this embodiment (similar to the embodiment of FIGS. 6 to 10), the upper end portion 34 of the hinge pin receiving post 30" includes a pair of opposed stop surfaces 68 arranged such that, in operation, when the flapper elements 10 move into the fully open position, bumper elements 52 on the upper surfaces 16 of the flapper elements engage with the stop surfaces 68 of the hinge pin receiving post 30", preventing pivotal movement of each of the flapper elements 10 beyond this angle. Thus, as with the embodiment of FIGS. 6 to 10, during impacts between the flapper elements 10 and stop surfaces 68, energy is transferred directly into the hinge pin receiving posts 30".

In any of the foregoing embodiments, the maximum angle may, for example, be determined or chosen so as to facilitate optimal forces upon the flapper elements 10 and/or to permit an optimal fluid flow through the valve 2.

In any of the foregoing embodiments, the serpentine-like shape of the intermediate portion 36 of the hinge pin receiving posts 30, 30', 30" facilitates increased stress distribution and energy dissipation during valve operation. Thus, due to the increased impact force absorption provided by the hinge pin receiving posts 30, 30', 30", they may be made lighter than prior hinge pin receiving posts. Additionally, the hinge pin receiving post 30, 30', 30" design may also allow the flapper elements 10 to open at higher velocities without inflicting damage to both the flapper elements 10 and the hinge pin receiving posts 30, 30', 30". This in turn may improve valve lifespan and improve valve efficiency.

In any of the aforementioned embodiments, the slots 40 of the intermediate portion 36 of the hinge pin receiving post 30, 30', 30" may be machined into the mounting post 30, 30', 30", for example by Electrical Discharge Machining (EDM). Alternatively, the slots 40 may be moulded into the hinge pin receiving post 30, 30', 30" by any suitable moulding method. For example, the embodiment of FIGS. 1 to 5 and 11 and 12 may be most easily be manufactured by machining, while the embodiment of FIGS. 6 to 10 may be most easily manufactured by moulding.

The material chosen to manufacture the hinge pin receiving posts 30, 30', 30" will depend on the particular application. For example, in low temperature and/or pressure applications a fibre reinforced composite or plastic material may be suitable. For higher temperature and/or temperature applications, a steel, such as a nickel steel, a superalloy (for example Inconel®), an aluminium alloy or a titanium alloy may be appropriate.

It will be appreciated that the hinge pin receiving post construction disclosed herein may be employed in new valve constructions, and potentially also in the refurbishment or repair of existing check vales where the prior hinge pin receiving posts may be replaced with the new construction.

It will also be appreciated that the stop pin arrangement disclosed in the embodiment of FIGS. 1 to 5 can be used in the embodiments of FIGS. 6 to 10 and 11 and 12, and the stop surface arrangement disclosed in the embodiment of FIGS. 6 to 10 and 11 and 12 can be used in the embodiment of FIGS. 1 to 5.

The figures and the accompanying description above describe a particular embodiment of the disclosure and it will be understood that further modifications may be made to the described embodiments without departing from the scope of the disclosure.

The invention claimed is:

1. A hinge pin receiving post for use in a check valve that includes a valve housing defining a pair of valve openings, a pair of flapper elements pivotably mounted to at least one hinge pin for rotation relative to the housing between an open position in which they permit fluid flow through the respective valve openings and a closed position in which they prevent fluid flow through the valve openings, the hinge pin receiving post comprising:
 a first, lower end portion having an opening for receiving said hinge pin and for mounting to the valve housing;
 a second, upper end portion; and
 a flexible, serpentine portion intermediate the end portions;
 wherein said serpentine intermediate portion of the hinge pin receiving post comprises a series of slots extending into opposed sides of the hinge pin receiving post in an alternating manner.

2. The hinge pin receiving post of claim 1, wherein an inner end of each slot of the hinge pin receiving post is enlarged relative to a medial portion of the slot.

3. The hinge pin receiving post of claim 1, wherein said slots are machined into said hinge pin receiving post or are moulded into said post.

4. A check valve comprising:
 a valve housing defining a pair of valve openings;
 a pair of flapper elements pivotably mounted to at least one hinge pin for rotation relative to the housing between an open position in which they permit fluid flow through the respective valve openings and a closed position in which they prevent fluid flow through the valve openings; and
 at least one hinge pin receiving post extending upwardly from the valve housing;
 wherein the at least one hinge pin receiving post comprises a first, lower end portion having an opening for receiving the at least one hinge pin, a second, upper end portion and a flexible, serpentine portion intermediate the end portions;
 wherein said serpentine intermediate portion of the at least one hinge pin receiving post comprises a series of slots extending into opposed sides of the at least one hinge pin receiving post in an alternating manner.

5. The check valve of claim 4, wherein an inner end of each slot of the at least one hinge pin receiving post is enlarged relative to a medial portion of the slot.

* * * * *